(12) United States Patent
Strom et al.

(10) Patent No.: US 8,738,536 B2
(45) Date of Patent: May 27, 2014

(54) LICENSING CONTENT FOR USE ON PORTABLE DEVICE

(75) Inventors: Clifford P. Strom, Sammamish, WA (US); Michael Y. Siu, Bellevue, WA (US); Brian P. Evans, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1724 days.

(21) Appl. No.: 11/108,038

(22) Filed: Apr. 14, 2005

(65) Prior Publication Data

US 2006/0235801 A1    Oct. 19, 2006

(51) Int. Cl.
*G06F 21/00*    (2013.01)
*G06Q 20/00*    (2012.01)

(52) U.S. Cl.
USPC ............................................................. 705/59

(58) Field of Classification Search
USPC ............ 705/59, 16, 21, 71; 380/44, 262, 278, 380/279
See application file for complete search history.

(56) References Cited

U.S. PATENT DOCUMENTS

| | | | |
|---|---|---|---|
| 3,718,906 A | 2/1973 | Lightner | 340/147 R |
| 4,323,921 A | 4/1982 | Guillou | 358/114 |
| 4,528,643 A | 7/1985 | Freeny, Jr. | 364/900 |
| 4,658,093 A | 4/1987 | Hellman | 380/25 |
| 4,683,553 A | 7/1987 | Mollier | 380/4 |
| 4,827,508 A | 5/1989 | Shear | 380/4 |
| 4,916,738 A | 4/1990 | Chandra et al. | 380/25 |
| 4,926,479 A | 5/1990 | Goldwasser et al. | 380/23 |
| 4,953,209 A | 8/1990 | Ryder, Sr. et al. | 380/23 |
| 4,977,594 A | 12/1990 | Shear | 380/4 |
| 5,050,213 A | 9/1991 | Shear | 380/25 |
| 5,103,392 A | 4/1992 | Mori | 395/725 |
| 5,103,476 A | 4/1992 | Waite et al. | 380/4 |
| 5,109,413 A | 4/1992 | Comerford et al. | 380/4 |
| 5,117,457 A | 5/1992 | Comerford et al. | 380/3 |

(Continued)

FOREIGN PATENT DOCUMENTS

| | | |
|---|---|---|
| EP | 0 715 246 B1 | 6/1996 |
| EP | 0 715 247 B1 | 6/1996 |

(Continued)

OTHER PUBLICATIONS

Windows Media, "A technical Overview of Windows Media DRM 10 for Devices" Microsoft Corp. Sep. 2004.*

(Continued)

*Primary Examiner* — Dante Ravetti
(74) *Attorney, Agent, or Firm* — Carole Boelitz; Micky Minhas (57) ABSTRACT

A computing device has encrypted content and a corresponding license having a decryption key for decrypting the content. The license allows the computing device to render the content thereon. The computing device may issue a sub-license based on the license to a portable device. The sub-license allows the portable device to render the content thereon and has the decryption key. The portable device has a digital device certificate including information thereon. The computing device receives from the portable device the device certificate thereof, and determines based on rules in the license and the information on the portable device in the device certificate whether the computing device can issue the sub-license to the portable device. If so, the computing device constructs such sub-license to include the decryption key (KD) and transmits the constructed sub-license to the portable device.

12 Claims, 5 Drawing Sheets

(56) References Cited

U.S. PATENT DOCUMENTS

| | | | |
|---|---|---|---|
| 5,193,573 A | 3/1993 | Chronister | 137/315 |
| 5,222,134 A | 6/1993 | Waite et al. | 380/4 |
| 5,261,002 A | 11/1993 | Perlman et al. | 380/30 |
| 5,319,705 A | 6/1994 | Halter et al. | 380/4 |
| 5,410,598 A | 4/1995 | Shear | 380/4 |
| 5,473,692 A | 12/1995 | Davis | 380/25 |
| 5,490,216 A | 2/1996 | Richardson, III | 380/4 |
| 5,509,070 A | 4/1996 | Schull | 380/4 |
| 5,629,980 A | 5/1997 | Stefik et al. | 380/4 |
| 5,634,012 A | 5/1997 | Stefik et al. | 395/239 |
| 5,638,443 A | 6/1997 | Stefik et al. | 380/4 |
| 5,673,316 A | 9/1997 | Auerbach et al. | 380/4 |
| 5,710,887 A | 1/1998 | Chelliah et al. | 395/226 |
| 5,715,403 A | 2/1998 | Stefik | 395/244 |
| 5,765,152 A | 6/1998 | Erickson | 707/9 |
| 5,809,144 A | 9/1998 | Sirbu et al. | 380/25 |
| 5,845,281 A | 12/1998 | Benson et al. | 707/9 |
| 5,892,900 A | 4/1999 | Ginter et al. | 395/186 |
| 5,917,912 A | 6/1999 | Ginter et al. | 380/24 |
| 5,953,420 A | 9/1999 | Matyas, Jr. et al. | 380/21 |
| 6,073,124 A | 6/2000 | Krishnan et al. | 705/59 |
| 6,078,909 A | 6/2000 | Knutson | 705/59 |
| 6,094,487 A | 7/2000 | Butler et al. | 380/270 |
| 6,189,146 B1 | 2/2001 | Misra et al. | 717/11 |
| 6,219,652 B1 | 4/2001 | Carter et al. | 705/59 |
| 6,226,618 B1 | 5/2001 | Downs et al. | 705/1 |
| 6,233,567 B1 | 5/2001 | Cohen | 705/59 |
| 6,289,452 B1 | 9/2001 | Arnold et al. | 713/175 |
| 6,330,670 B1 | 12/2001 | England et al. | 713/2 |
| 6,343,280 B2 | 1/2002 | Clark | 705/55 |
| 6,574,609 B1 | 6/2003 | Downs et al. | 705/59 |
| 6,574,612 B1 | 6/2003 | Baratti et al. | 705/59 |
| 6,681,017 B1 | 1/2004 | Matias et al. | 380/277 |
| 6,832,319 B1 | 12/2004 | Bell et al. | 713/193 |
| 7,010,808 B1* | 3/2006 | Leung et al. | 726/26 |
| 7,073,063 B2* | 7/2006 | Peinado | 713/171 |
| 7,146,504 B2* | 12/2006 | Parks et al. | 713/178 |
| 2001/0051996 A1* | 12/2001 | Cooper et al. | 709/217 |
| 2001/0052077 A1 | 12/2001 | Fung et al. | 713/184 |
| 2001/0056539 A1 | 12/2001 | Pavlin et al. | 713/193 |
| 2002/0013772 A1* | 1/2002 | Peinado | 705/51 |
| 2003/0194094 A1 | 10/2003 | Lampson et al. | 380/282 |
| 2004/0139312 A1* | 7/2004 | Medvinsky | 713/150 |
| 2005/0198510 A1* | 9/2005 | Robert et al. | 713/175 |
| 2005/0226170 A1* | 10/2005 | Relan et al. | 370/254 |
| 2006/0010076 A1* | 1/2006 | Cutter et al. | 705/63 |
| 2006/0229990 A1* | 10/2006 | Shimoji et al. | 705/50 |

FOREIGN PATENT DOCUMENTS

| | | |
|---|---|---|
| WO | WO 93/01550 A1 | 1/1993 |
| WO | WO 96/13013 A1 | 5/1996 |
| WO | WO 96/24092 A3 | 8/1996 |
| WO | WO 96/27155 A2 | 9/1996 |
| WO | WO 97/25798 A1 | 7/1997 |
| WO | WO 97/43761 A2 | 11/1997 |
| WO | WO 98/09209 A1 | 3/1998 |
| WO | WO 98/10381 A1 | 3/1998 |
| WO | WO 98/21679 A1 | 5/1998 |
| WO | WO 98/24037 A1 | 6/1998 |
| WO | WO 98/37481 A1 | 8/1998 |
| WO | WO 00/15221 A1 | 3/2000 |
| WO | WO 00/58811 A3 | 10/2000 |
| WO | WO 00/59150 A2 | 10/2000 |

OTHER PUBLICATIONS

"Aladdin Knowledge Systems Partners with Rights Exchange, Inc. to Develop a Comprehensive Solution for Electronic Software Distribution," Aug. 3, 1988, 5 pages.

Armati, D., "Tools and standards for protection, control and presentation of data," Apr. 3, 1996, 17 pages.

Benjamin, R. et al., "Electronic markets and virtual value chains on the information superhighway," *Sloan Management Rev.*, Winter, 1995, 62-72.

Cassidy, "A Web developers guide to content encapsulation technology," Apr. 1997, 5 pages.

Cox, B., "Superdistribution," *Idees Fortes*, Sep. 1994, 2 pages.

Cox, B., "What if There Is a Silver Bullet," *J. Object Oriented Programm.*, Jun. 1992, 8-9 and 76.

Griswold, G.N., "A Method for Protecting Copyright on Networks," *IMA Intell. Property Project Proceedings*, Jan. 1994, 1(1), 169-178.

Hauser, R.C., "Does licensing require new access control techniques?" Aug. 1993, 9 pages.

Hudgins-Bonafield, C. "Selling Knowledge on the Net," *Network Computing*, Jun. 1, 1995, 102-109.

"IBM spearheading intellectual property protection technology for information on the Internet," May 1996, 3 pages.

"Technological Solutions Rise to Complement Law's Small Stick Guarding Electronic Works," *Information Law Alert*, Jun. 16, 1995, 3-4 and 7.

Kaplan, M.A., "IBM Cryptolopes_, Super-Distribution and Digital Rights Management," Dec. 1996, 7 pages.

Kent, S.T., "Protecting externally supplied software in small computers," Sep. 1980, 1-42 and 250-252.

Kohl, U. et al., "Safeguarding Digital Library Contents and Users; Protecting Documents Rather Than Channels," *D-Lib Magazine*, Sep. 1997, 9 pages.

Linn, R.J., "Copyright and Information Services in the Context of the National Research and Education Network," *IMA Intell. Property Project Proceedings*, Jan. 1994, 1(1), 1 and 10-20.

McNab, L., "Super-distribution works better in practical applications," Mar. 2, 1998, 2 pages.

Moeller, M., "NetTrust lets Cyberspace Merchants Take Account," *PC Week*, Nov. 20, 1995, 12(48), 1 page.

Moeller, M., "IBM takes charge of E-commerce; Plans client, server apps based on SET," Apr. 1996, 4 pages.

Pemberton, J., "An Online Interview with Jeff Crigler at IBM InfoMarket," Jul. 1996, 6 pages.

"LicensIt: kinder, gentler copyright? Copyright management system links content, authorship information," *Seybold Report on Desktop Publishing*, 1996, 10(11), 2 pages.

Sibert, O. et al., "The DigiBox: A Self-protecting Container for Information Commerce," *First USENIX Workshop on Electronic Commerce*, Jul. 11-12, 1995, 171-183.

Sibert, O. et al., "Securing the Content, Not the Wire, for Information Commerce," Jul. 1995, 1-11.

Stefik, M., "Trusted Systems," Mar. 1997, 8 pages.

Stefik, M., "Shifting the Possible: How Trusted Systems and Digital Property Rights Challenge Us to Rethink Digital Publishing," *Technical Perspective*, 1997, 137-159.

"Rights Management in the Digital Age: Trading in Bits, Not Atoms," Spring, 1997, 4, 3 pages.

Weber, R., "Digital Right Management Technology," Oct. 1995, 35 pages.

White, S.R. et al., "ABYSS: An Architecture for Software Protection," *IEEE Trans. On Software Engineering*, Jun. 1990, 16(6), 619-629.

White, S.R. et al., "ABYSS: A trusted architecture for software protection," *IEEE Symposium on Security and Privacy*, Apr. 27-29, 1987, 38-51.

Ramanujapuram, A. et al., "Digital Content & Intellectual Property Rights: A specification language and tools for rights management," Dec. 1998, 20-23 and 26.

Unknown, Optimising license checkouts from a floating license server, *ARM the Architecture for the Digital World*, http://www.arm.com/support/faqdev/1391.html.

Thompson, C.W., et al., "Digital licensing," *IEEE Internet Computing*, 2005, 9(4).

Olson, M., et al., "Concurrent access licensing," *UNIX Review*, 1988, 6(9), 67-72 (from Dialog Accession No. 01254918).

Unknown, Finland—Data fellows secures ICSA certification, *Newsbytes*, 1998, (from DialogClassic Web(TM), File 9, Accession No. 01451058, 2 pages).

(56) References Cited

OTHER PUBLICATIONS

Unknown, "Black box crypton defies the hackers," *Electronic Weekly*, 1985, 1257, p. 26 (from DialogClassic Web™ file 275, Accession No. 01116377).

Unknown, "Solution for piracy," *Which Computer*, 1983, p. 29 (from DialogClassic Web™ file 275, Accession No. 01014280).

From PR Newswire, "Sony develops copyright protection solutions for digital music content," 1999, http://www.findarticles.com.

From http://www.findarticles.com, "BreakerTech joins copyright management market," *Computer International*, 1999.

Kahn, R.E, "Deposit, Registration and Recordation in an electronic copyright management system," *IMA Intellectual Property Project Proceedings*, 1994, 1(1), 111-120.

"Aladdin acquires the assets of Micro Macro Technologies," *Business Wire*, 1999 http://www.findarticles.com.

\* cited by examiner

LICENSING CONTENT FOR USE ON PORTABLE DEVICE

TECHNICAL FIELD

The present invention relates to an architecture for enforcing rights in digital content. More specifically, the present invention relates to such an enforcement architecture that allows a portable device to decrypt and render encrypted digital content only in accordance with rules associated with the content. Even more specifically, the present invention relates to such an architecture that licenses use of the content on the portable device based in part on information contained within a digital certificate associated with such portable device.

BACKGROUND OF THE INVENTION

Figure 1:
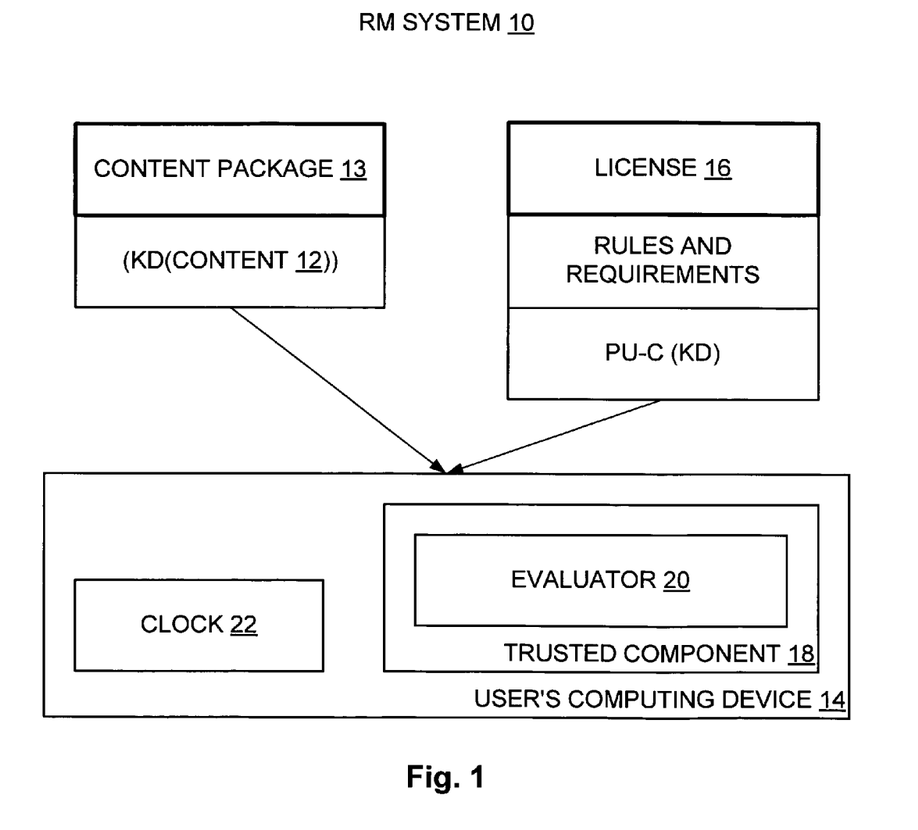
FIG. 1 is a block diagram showing an enforcement architecture of an example of a trust-based system.

As is known, and referring now to FIG. 1, a rights management (RM) and enforcement system is highly desirable in connection with digital content 12 such as digital audio, digital video, digital text, digital data, digital multimedia, etc., where such digital content 12 is to be distributed to users. Upon being received by the user, such user renders or 'plays' the digital content with the aid of an appropriate rendering device such as a media player on a personal computer 14, a portable playback device or the like.

Typically, a content owner distributing such digital content 12 wishes to restrict what the user can do with such distributed digital content 12. For example, the content owner may wish to restrict the user from copying and re-distributing such content 12 to a second user, or may wish to allow distributed digital content 12 to be played only a limited number of times, only for a certain total time, only on a certain type of machine, only on a certain type of media player, only by a certain type of user, etc.

However, after distribution has occurred, such content owner has very little if any control over the digital content 12. An RM system 10, then, allows the controlled rendering or playing of arbitrary forms of digital content 12, where such control is flexible and definable by the content owner of such digital content. Typically, content 12 is distributed to the user in the form of a package 13 by way of any appropriate distribution channel. The digital content package 13 as distributed may include the digital content 12 encrypted with a symmetric encryption/decryption key (KD), (i.e., (KD(CONTENT))), as well as other information identifying the content, how to acquire a license for such content, etc.

The trust-based RM system 10 allows an owner of digital content 12 to specify rules that must be satisfied before such digital content 12 is allowed to be rendered. Such rules can include the aforementioned requirements and/or others, and may be embodied within a digital license 16 that the user/user's computing device 14 (hereinafter, such terms are interchangeable unless circumstances require otherwise) must obtain from the content owner or an agent thereof, or such rules may already be attached to the content 12. Such license 16 may for example include the decryption key (KD) for decrypting the digital content 12, perhaps encrypted according to another key decryptable by the user's computing device or other playback device.

The content owner for a piece of digital content 12 would prefer not to distribute the content 12 to the user unless such owner can trust that the user will abide by the rules specified by such content owner in the license 16 or elsewhere. Preferably, then, the user's computing device 14 or other playback device is provided with a trusted component or mechanism 18 that will not render the digital content 12 except according to such rules.

The trusted component 18 typically has an evaluator 20 that reviews the rules, and determines based on the reviewed rules whether the requesting user has the right to render the requested digital content 12 in the manner sought, among other things. As should be understood, the evaluator 20 is trusted in the DRM system 10 to carry out the wishes of the owner of the digital content 12 according to the rules, and the user should not be able to easily alter such trusted component 18 and/or the evaluator 20 for any purpose, nefarious or otherwise.

As should be understood, the rules for rendering the content 12 can specify whether the user has rights to so render based on any of several factors, including who the user is, where the user is located, what type of computing device 14 or other playback device the user is using, what rendering application is calling the RM system 10, the date, the time, etc. In addition, the rules may limit rendering to a pre-determined number of plays, or pre-determined play time, for example.

The rules may be specified according to any appropriate language and syntax. For example, the language may simply specify attributes and values that must be satisfied (DATE must be later than X, e.g.), or may require the performance of functions according to a specified script (IF DATE greater than X, THEN DO . . . , e.g.).

Upon the evaluator 20 determining that the user satisfies the rules, the digital content 12 can then be rendered. In particular, to render the content 12, the decryption key (KD) is obtained from a pre-defined source and is applied to (KD (CONTENT)) from the content package 13 to result in the actual content 12, and the actual content 12 is then in fact rendered.

In an RM system 10, content 12 is packaged by a content owner or distributor for use by a user by encrypting such content 12 and associating a set of rules with the content 12, whereby the content 12 can be rendered only in accordance with the rules. Because the content 12 can only be rendered in accordance with the rules, then, the content 12 may be freely distributed. Significantly, the content 12, the rules, and an encrypted version of the decryption key (KD) must be communicated to the computing device 14 or other playback device. Moreover, in preparing at least the encrypted version of the decryption key (KD), it is useful to tie the decryption key (KD) and by extension the license 16 containing such decryption key (KD) to the computing device 14 in such a manner that the encrypted decryption key (KD) cannot be accessed to decrypt and render the content 12 except by such computing device. Thus, the content 12, the rules, and the encrypted version of the decryption key (KD) cannot be redistributed in a manner so that the content 12 can be rendered widely and in contravention to the wishes of the content owner.

As may be appreciated, and as seen in FIG. 1, the encrypted decryption key (KD) and by extension the license 16 containing such decryption key (KD) are in fact tied to the computing device 14 by such decryption key (KD) being encrypted according to a public key (PU-C) of the computing device 14 to result in (PU-C(KD)). Presumptively, only the computing device 14 is in possession of the private key (PR-C) corresponding to (PU-C), and accordingly only such computing device 14 can apply (PR-C) to (PU-C(KD)) to reveal (KD).

Figure 3:
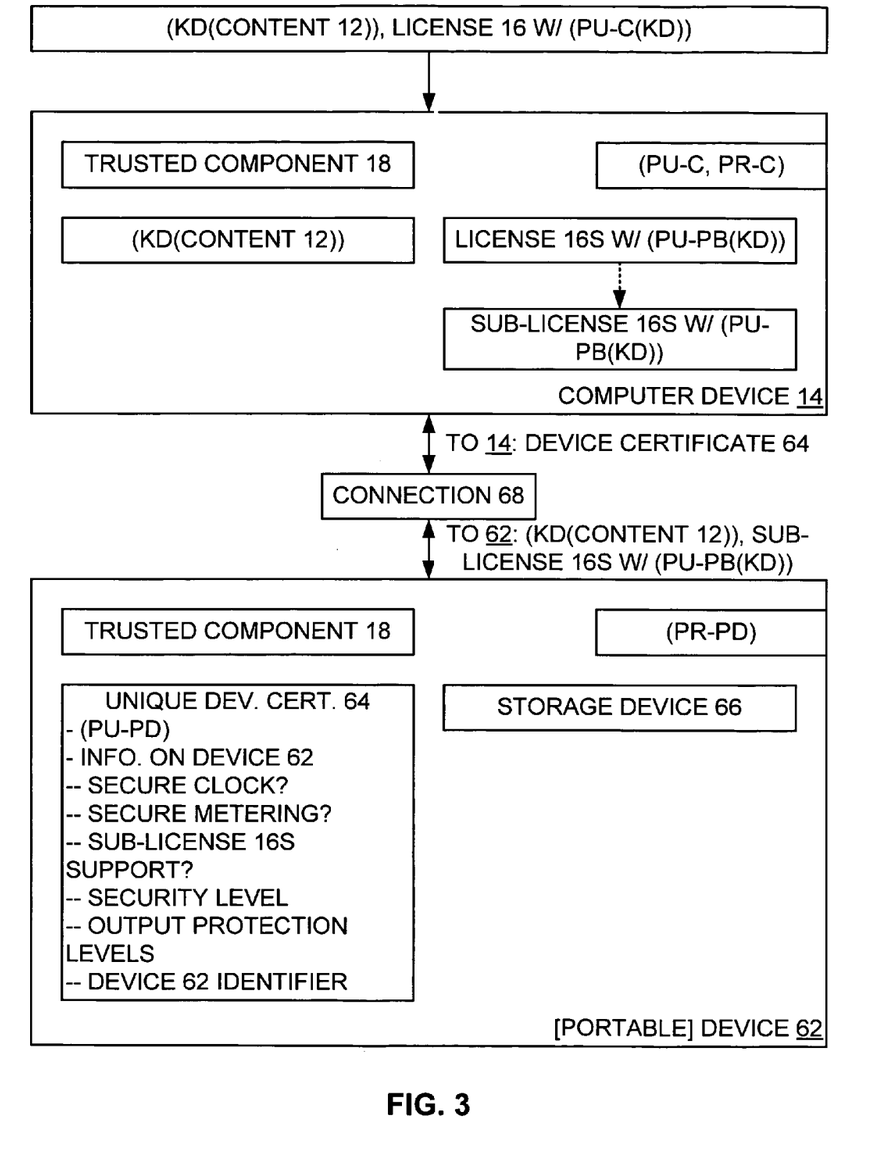
FIG. 3 is a block diagram showing a computing device with content and a corresponding license and coupled to a portable device for receiving a device certificate therefrom and issuing thereto a sub-license based on the license and the device certificate in accordance with one embodiment of the present invention.

In at least some instances, the computing device 14 may transfer a piece of content 12 to another device such as a portable device 62 (FIG. 3). In the course of such transfer, the computing device 14 may also construct a sub-license 16s based on the license 16 and transfer such sub-license 16s to the portable device 62 to allow the portable device 16s to render the content 16. One possible method for doing so is set forth in U.S. patent application Ser. No. 09/892,371, filed Jun. 27, 2001, hereby incorporated by reference in its entirety. As may be appreciated, however, the computing device 14 may construct the sub-license 16s based on the license 16 and transfer such sub-license 16s to the portable device 16s only if the rules set forth within the license 16 so allow.

Previously, such a portable device 62 was considered to be relatively simple, and therefore did not include much in the way of capabilities. For example, the portable device 62 did not have much memory or processing power and therefore was considered to be limited in the functions such portable device 62 could perform. As a result, the portable device 62 was not expected to perform higher level functions such as asymmetric cryptography, and was not provided with any unique indicia such as a digital device certificate with an asymmetrically validated digital signature.

However, such a portable device 62 is now no longer considered to be relatively simple, and instead has more capabilities. For example, at least some portable devices 62 now have much more memory and processing power and therefore are considered to be more capable of performing complex functions. As a result, the portable device 62 can now be expected to perform higher level functions such as asymmetric cryptography, and may now be provided with a unique indicia such as a digital device certificate with an asymmetrically validated digital signature.

Of particular interest, with such a device certificate, the portable device 62 now can be described within such a certificate in much greater detail. Thus, in the course of the computing device 14 constructing the sub-license 16s based on the license 16 and transferring such sub-license 16s to the portable device 16s only if the rules set forth within the license 16 so allow, such computing device 14 may employ such description within the device certificate to determine whether to in fact construct and transfer (i.e., issue) the aforementioned sub-license 16s.

Accordingly, a need exists for a method and mechanism that the computing device 14 may employ in the connection with the device certificate of a portable device 62 to determine whether to issue a sub-license 16s to the portable device 62 to allow same to render a corresponding piece of digital content 16.

SUMMARY OF THE INVENTION

The aforementioned needs are satisfied at least in part by the present invention in which a method is provided in connection with a computing device having encrypted digital content and a corresponding digital license having a decryption key (KD) for decrypting the encrypted content. The license allows the computing device to render the content thereon. The method is for the computing device to issue a digital sub-license based on the license to a portable device communicatively coupled thereto. The sub-license allows the portable device to render the content thereon and has the decryption key (KD). The portable device has a digital device certificate including information on the portable device.

In the method, the computing device receives from the portable device a copy of the device certificate thereof, and determines based on rules in the license and also based on the information on the portable device as set forth within the device certificate whether the computing device can in fact issue the sub-license to the portable device. If the computing device can in fact issue the sub-license to the portable device, the computing device constructs such sub-license to include the decryption key (KD) and transmits the constructed sub-license to the portable device.

BRIEF DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings.

DETAILED DESCRIPTION OF THE INVENTION

Computer Environment

FIG. 1 and the following discussion are intended to provide a brief general description of a suitable computing environment in which the present invention and/or portions thereof may be implemented. Although not required, the invention is described in the general context of computer-executable instructions, such as program modules, being executed by a computer, such as a client workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

Figure 2:
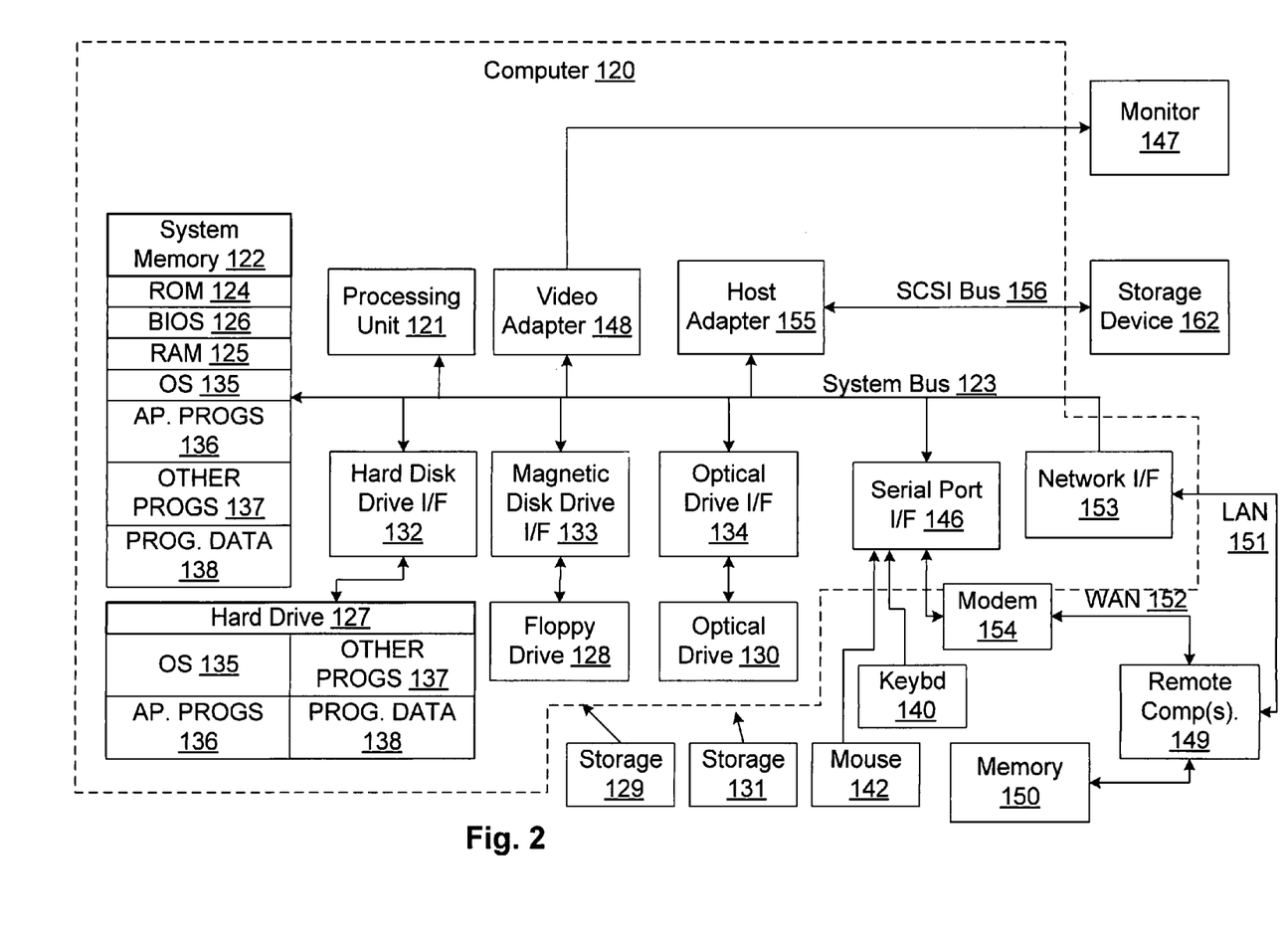
FIG. 2 is a block diagram representing a general purpose computer system in which aspects of the present invention and/or portions thereof may be incorporated.

As shown in FIG. 2, an exemplary general purpose computing system includes a conventional personal computer 120 or the like, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124.

The personal computer 120 may further include a hard disk drive 127 for reading from and writing to a hard disk (not shown), a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the personal computer 20.

Although the exemplary environment described herein employs a hard disk, a removable magnetic disk 129, and a removable optical disk 131, it should be appreciated that other types of computer readable media which can store data that is accessible by a computer may also be used in the exemplary operating environment. Such other types of media include a magnetic cassette, a flash memory card, a digital video disk, a Bernoulli cartridge, a random access memory (RAM), a read-only memory (ROM), and the like.

A number of program modules may be stored on the hard disk, magnetic disk 129, optical disk 131, ROM 124 or RAM 125, including an operating system 135, one or more application programs 136, other program modules 137 and program data 138. A user may enter commands and information into the personal computer 120 through input devices such as a keyboard 140 and pointing device 142. Other input devices (not shown) may include a microphone, joystick, game pad, satellite disk, scanner, or the like. These and other input devices are often connected to the processing unit 121 through a serial port interface 146 that is coupled to the system bus, but may be connected by other interfaces, such as a parallel port, game port, or universal serial bus (USB). A monitor 147 or other type of display device is also connected to the system bus 123 via an interface, such as a video adapter 148. In addition to the monitor 147, a personal computer typically includes other peripheral output devices (not shown), such as speakers and printers. The exemplary system of FIG. 2 also includes a host adapter 155, a Small Computer System Interface (SCSI) bus 156, and an external storage device 162 connected to the SCSI bus 156.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 2. The logical connections depicted in FIG. 2 include a local area network (LAN) 151 and a wide area network (WAN) 152. Such networking environments are commonplace in offices, enterprise-wide computer networks, intranets, and the Internet.

When used in a LAN networking environment, the personal computer 120 is connected to the LAN 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

Licensing Content for Use on Portable Device

Typically, an RM system 10 such as has been set forth above protects digital content 12 by among other things having a user's computing device 14 authenticate itself as a legitimate RM component and transmitting one or more cryptographic keys for purposes of constructing and receiving an encrypted version of a decryption key (KD) by which the content 12 may be accessed. Such authentication and key transmittal can include an interactive process including signed certificates, negotiations, exchanges of asymmetric and symmetric keys, and the like, where the interactive process is accomplished over a network connection or the like between the computing device 14 and a remote entity such as a license server.

However, it is to be appreciated that in doing so the content 12 is in effect tied to the computing device 14 and therefore is not able to be rendered except in the presence of such computing device 14. Especially in the case when a user of the content 12 may wish to transport such content 12 to a device such as a portable device 62, then, it would be desirable to store the content 12 on the portable device 62 along with rules for accessing the content 12 and the encrypted version of the decryption key (KD). However, it would also be desirable to prevent such items from being widely redistributed in a manner contrary to the wishes of the content owner. Accordingly, in one embodiment of the present invention, at least the encrypted decryption key (KD) is tied to the portable device 62 in a manner such that such decryption key (KD) cannot be accessed except in the presence of such portable device 62.

As may be appreciated, the device such as the portable device 62 may be any device without departing from the spirit and scope of the present invention. If in fact a portable device 62, such portable device 62 may be a digital music player, a digital video player, a digital multimedia player, or the like. Of course, to participate within the RM system 10, the portable device 62 must have a public-private key pair (PU-PD, PR-PD) and some form of a trusted component 18.

Significantly, and in one embodiment of the present invention, to tie the encrypted version of the decryption key (KD) to the portable device 62, such portable device 62 includes a unique device certificate 64 (FIG. 3) as directly or indirectly provided by an issuer that should be trusted by the computing device 14, the device certificate 61 includes the public key (PU-PD) of the portable device 62 and has a corresponding private key (PR-PD) known only to the portable device 62, and the decryption key (KD) is encrypted according to the public key (PU-PD) to result in (PU-PD(KD)). Thus, only the portable device 62 in possession of the corresponding private key (PR-PD) may apply same to (PU-PD(KD)) to reveal the content key (KD). Alternatively, a symmetric key of the portable device 62 as located within the device certificate 61 may be employed under appropriate circumstances.

Thus, in the present invention, and referring now to FIG. 3, a portable device 62 can render or play back the content 12 as licensed to the computing device 14 by way of a license 16, but only if the portable device 62 receives the content 12 from the computing device 14 and also receives an appropriate sub-license 16s from the computing device 14 based on the license 16.

In one mode of obtaining and rendering digital content 12, and still referring to FIG. 3, such digital content 12 is downloaded or otherwise obtained from the computing device 14 and is placed on the portable device 62 in an appropriative storage device 66 thereof. Such storage device 64 may be any appropriate storage device without departing from the spirit and scope of the present invention. For example, such storage device 64 may be a fixed or removable RAM or a fixed or removable disk drive or the like.

As was alluded to above, the license 16 corresponding to the content 12 and issued to the computing device 14 includes a decryption key (KD) for decrypting the encrypted content 12, where (KD) is itself encrypted according to a public key (PU-C) of the computing device 14. In addition, the license 16 includes a set of usage rules that in particular specify whether and under what conditions the computing device 14 may issue the sub-license 16s for the portable device 62. The rules may take any appropriate form without departing from the spirit and scope of the present invention. Methods and mechanisms for generating and expressing such rules are known or should be apparent to the relevant public and therefore need not be set forth herein in any detail. Generally, the rules may specify the limitations, if any, that must be satisfied to issue the sub-license 16s, and also rules that are to go into the issued sub-license 16s regarding rendering the corresponding content 12 on the portable device 62.

Still referring to FIG. 3, to download the digital content 12 and a corresponding sub-license 16s to the portable device 62, such portable device 62 must be coupled to the computing device 14 by way of a connection 68 which may be any appropriate connection without departing from the spirit and scope of the present invention. For example, the connection 66 may be an appropriate cable, a wireless link such as an RF or IR link, or the like. Such connections 63 and hardware and/or software in support thereof are known or should be apparent to members of the relevant public and therefore need not be described herein in any further detail.

In one embodiment of the present invention, the device certificate 64 of the portable device 62 includes in addition to the public key (PU-PD) of the portable device 62 information on the portable device 62 including items such as for example an identification of the portable device 62, capabilities of the portable device 62, and relative values assigned to the portable device, among other things. While such items may be any appropriate items without departing from the spirit and scope of the present invention, particular ones of such items are set forth in more detail below.

Significantly, and in one embodiment of the present invention, with such a device certificate 64 having such description of the portable device 62, the computing device 14 refers to the information in such device certificate 64 of such portable device 62 in the course of determining whether to issue a sub-license 16s to the portable device 62 to allow same to render a corresponding piece of digital content 16 thereon. In general, then, and referring now to FIG. 4, to transfer content 12 and a corresponding sub-license 16s from a computing device 14 to a portable device 62, the process in pertinent part is initiated upon the portable device 62 sending a copy of the device certificate 64 thereof to the computing device 14 (step 401), either at the request of such computing device 14 or such portable device 62, and the computing device 14 determines based on rules in the license 16 for the content 14 at the computing device 14 and also based on the information on the portable device 62 as set forth within the device certificate 64 whether the computing device 14 can in fact issue the sub-license 16s to the portable device 62 for the content 12 (step 403), as will be set forth in more detail below.

Figure 4:
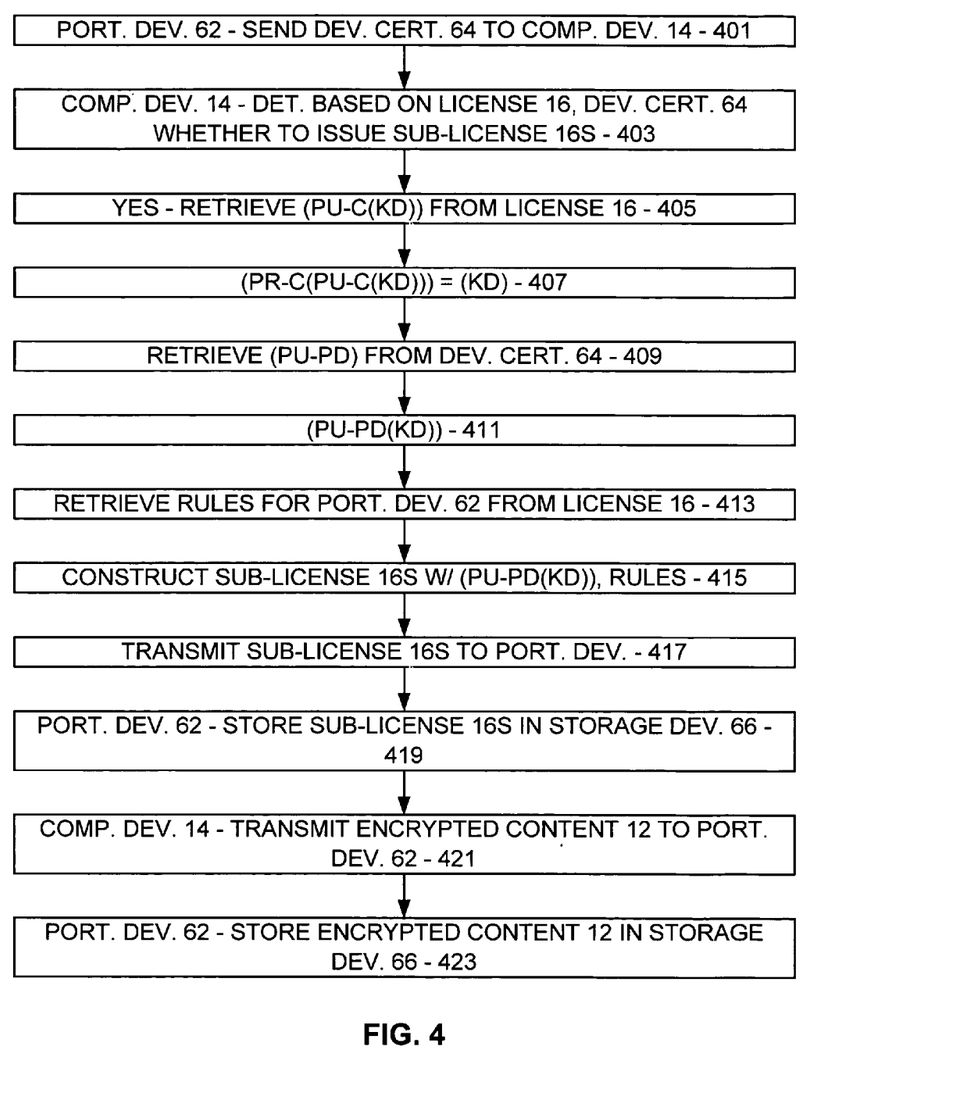
FIG. 4 is a flow diagram showing key steps performed by the computing device and portable device of FIG. 3 in issuing the sub-license in accordance with one embodiment of the present invention.

If the computing device 14 can in fact issue the sub-license 16s to the portable device 62 for the content 12, the computing device 14 retrieves (PU-C(KD)) from the license 16 (step 405), applies (PR-C) thereto to reveal (KD) (step 407), retrieves (PU-PD) from the device certificate 64 (step 409), and applies (PU-PD) to (KD) to result in (PU-PD(KD)) (step 411). Thereafter, the computing device 14 retrieves whatever rules for the portable device 62 are present in the license 16 (step 413), constructs the sub-license 16s to include (PU-PD (KD)) and the rules for the portable device 62 (step 415), and transmits the sub-license 16s to the portable device (step 417) after which the portable device 62 appropriately stores such sub-license 16s in the storage device 66 thereof (step 419). In addition, the computing device 14 at some point transmits the encrypted content 12 to the portable device 62 (step 421) and the portable device 62 appropriately stores such encrypted content 12 in the storage device 66 thereof (step 423).

Note in particular that constructing the sub-license 16s as at step 415 may be performed in any appropriate manner without departing from the spirit and scope of the present invention. Constructing such sub-license is known or should be apparent to the relevant public and therefore need not be set forth herein in any detail. Typically, though, such sub-license 16s includes a digital signature based on the private key (PR-C) of the computing device 14 and therefore may be validated by the portable device 62 by application of the corresponding public key (PU-C), which may be provided by way of an appropriate chain of certificates attached to the sub-license 16s by the computing device 14.

Figure 5:
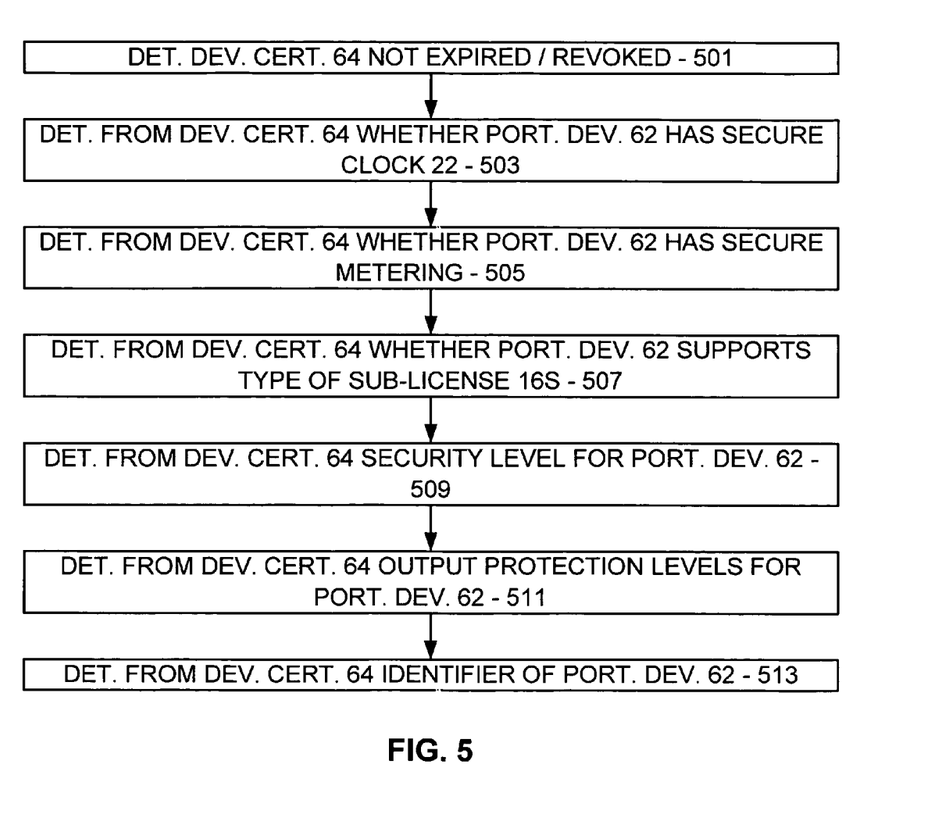
FIG. 5 is a flow diagram showing key steps performed by the computing device of FIG. 3 in determining whether to issue the sub-license based on the license and the device certificate in accordance with one embodiment of the present invention.

Turning now to FIG. 5, in one embodiment of the present invention, the computing device 14 determines based on the rules in the license 16 for the content 14 at the computing device 14 and also based on the information on the portable device 62 as set forth within the device certificate 64 whether the computing device 14 can in fact issue the sub-license 16s to the portable device 62 for the content 12 as at step 403 in the following manner.

Preliminarily, and in one embodiment of the present invention, the computing device 14 determines that the device certificate 64 has not expired or been revoked (step 501). As should be understood, if revoked or expired, the computing device 14 does not issue the corresponding portable device 62 any sub-licenses 16s. Revocation in particular is typically determined by the computing device 14 with reference to one or more revocation lists obtained elsewhere. Checking for revocation is known or should be apparent to the relevant public and therefore need not be set forth herein in any detail.

If the license 16 so requires, the computing device 14 may also determine from the device certificate 64 whether the corresponding portable device 62 has a clock 22 such as that shown in FIG. 1, and if so whether the clock 22 is a secure clock, and if so whether the secure clock is set correctly (step 503). As may be appreciated, a clock 22 may be necessary if an issued sub-license 16s based on the license 16 includes time-based limitations. As may also be appreciated, a secure clock 22 is one that can be trusted to be resistant to a user-initiated change in an effort to overcome such a time-based limitation. Such a secure clock 22 is known or should be apparent to the relevant public and therefore need not be set forth herein in any detail. As should be understood, if a secure clock 22 is required by the license 16 but is not listed in the device certificate 64, the computing device 14 does not issue the corresponding portable device 62 any sub-license 16s based on such license 16.

Similarly, if the license 16 so requires, the computing device 14 may also determine from the device certificate 64 whether the corresponding portable device 62 has secure metering capabilities (step 505). As may be appreciated, such secure metering capabilities may be necessary if an issued sub-license 16s based on the license 16 requires metering functionality. As may also be appreciated, a portable device 62 has such secure metering capabilities if, among other things, the portable device 62 can maintain state with regard to each sub-license 16s thereof, and can store such maintained state in a secure store that can be trusted to be resistant to a user-initiated change in an effort to overcome such a metering requirement. Such secure metering capabilities are known or should be apparent to the relevant public and therefore need not be set forth herein in any detail. As should be understood, if secure metering capabilities are required by the license 16 but are not listed in the device certificate 64, the computing device 14 does not issue the corresponding portable device 62 any sub-license 16s based on such license 16.

Likewise, if the license 16 so requires, the computing device 14 may also determine from the device certificate 64 whether the corresponding portable device 62 supports that particular type of sub-license 16s to be derived from such license 16 (step 507). As may be appreciated, such a support determination may be necessary in the event the issued sub-license 16s is of an unusual type. The type of a license may be any type without departing from the spirit and scope of the present invention. For example, the type may be a particular version or a particular variety of sub-license 16. As should be understood, if the device certificate 64 does specify that the corresponding portable device 62 supports the type at issue, the computing device 14 does not issue the portable device 62 any such type of sub-license 16s based on such license 16.

In a similar manner, if the license 16 so requires, the computing device 14 may also determine from the device certificate 64 a particular assigned security level for the corresponding portable device 62, and in particular whether the security level satisfies a minimum security level set within the license 16 (step 509). As may be appreciated here, such a security level is assigned to the portable device 62 by the issuer of the corresponding device certificate 64, and indicates a relative perceived level of security that the portable device 62 can be expected to satisfy. Thus, a portable device 62 with a relatively low security level is not expected to be very secure in protecting RM-managed content 12, and thus is not expected to be very trustworthy, while a portable device 62 with a relatively high security level is in fact expected to be very secure in protecting RM-managed content 12, and thus is in fact expected to be very trustworthy. As may also be appreciated, a portable device 62 gains a higher security level by, for example, using more secure cryptographic techniques, and/or by including more features to thwart any nefarious entity from obtaining RM-protected content 12 in an unencrypted form. Such features are many and varied but are generally known or should be apparent to the relevant public and therefore need not be set forth herein in any detail. As should be understood, if the assigned security level for the corresponding portable device 62 as set forth in the device certificate 64 does not satisfy the minimum security level of the license 16, the computing device 14 does not issue the corresponding portable device 62 any sub-license 16s based on such license 16.

In a manner akin to a security level, and if the license 16 so requires, the computing device 14 may also determine from the device certificate 64 one or more particular assigned output protection levels for the corresponding portable device 62, and in particular whether the output protection levels satisfy minimum output protection levels set within the license 16 (step 511). As may be appreciated here, and similar to a security level, such output protection levels are assigned to the portable device 62 by the issuer of the corresponding device certificate 64 or more likely by an impartial third party, and indicate a relative perceived level of output protection that is incumbent in the portable device 62. Each particular output protection level is with regard to a particular type of output, such as for example compressed and encrypted copying, uncompressed and decrypted copying, uncompressed digital audio output, compressed digital video output, encrypted analog video output, decrypted analog audio output, etc. For a particular type of output, then, the output protection level thereof if relatively low indicates that the type of output is not is not expected to be very secure in protecting RM-managed content 12, and thus is not expected to be very trustworthy, while the output protection level thereof if relatively high is in fact expected to be very secure in protecting RM-managed content 12, and thus is in fact expected to be very trustworthy. As should be understood, if the assigned output protection level for a particular type of output of the corresponding portable device 62 as set forth in the device certificate 64 does not satisfy the minimum output protection level of the license 16 for the type of output, the computing device 14 does not issue the corresponding portable device 62 any sub-license 16s based on such license 16.

Finally, if the license 16 so requires, the computing device 14 may also determine from the device certificate 64 a unique or non-unique identifier identifying the corresponding portable device 62, and in particular whether such identifier is on a list for special handling (step 513). As may be appreciated here, the identifier may be any appropriate identifier without departing from the spirit and scope of the present invention. For example, the identifier may be a globally unique identifier assigned to the portable device 62 by a manufacturer thereof, or a class identifier identifying a class of the portable device 62 as assigned by a classifying body.

At any rate, if the determined identifier is on a particular list, appropriate action is taken in accordance with the nature of the list. For example, if the list is an exclusion list, the computing device 14 does not issue the corresponding portable device 62 any sub-license 16s based on such license 16. Likewise, if the list is an inclusion list, the computing device 14 in fact issues the corresponding portable device 62 a sub-license 16s based on such license 16, even if the sub-license 16s should not otherwise be issued in accordance with any of the determinations of at least steps 503-511.

CONCLUSION

The present invention may be practiced with regard to any appropriate computing device 14 and portable device 62 with a device certificate 64. More concretely, the present invention for example could be used to enable a digital music player to download and render protected music, to allow a set-top box to have access to a premium television broadcast, etc. Accordingly, the device 62 is to be interpreted to encompass any device that has a set of device keys (PU-PD, PR-PD) as embodied by a device certificate 62 and that can receive content 12 and a corresponding sub-license 16s from a computing device and render the content 12 only in accordance with the terms of the sub-license 16s.

The programming necessary to effectuate the processes performed in connection with the present invention is relatively straight-forward and should be apparent to the relevant programming public. Accordingly, such programming is not attached hereto. Any particular programming, then, may be employed to effectuate the present invention without departing from the spirit and scope thereof.

In the foregoing description, it can be seen that the present invention comprises a new and useful method and mechanism that a computing device 14 may employ in the connection with the device certificate 64 of a portable device 62 to determine whether to issue a sub-license 16s to the portable device 62 to allow same to render a corresponding piece of digital content 16.

It should be appreciated that changes could be made to the embodiments described above without departing from the inventive concepts thereof. It should be understood, therefore, that this invention is not limited to the particular embodiments disclosed, but it is intended to cover modifications within the spirit and scope of the present invention as defined by the appended claims.

The invention claimed is:

1. A method in connection with a computing device having encrypted digital content and a license corresponding to the encrypted digital content, the license having a decryption key (KD) for decrypting the encrypted digital content, the license allowing the computing device to render the encrypted digital content thereon, the method for the computing device to issue a sub-license based on the license to a portable device communicatively coupled thereto, the sub-license for allowing the portable device to render the encrypted digital content thereon using the decryption key (KD), the method comprising:

receiving, by the computing device, a device certificate from the portable device including information relating to output protection levels assigned to the portable device by an issuer of the device certificate or a third party, the output protection levels assigned to the portable device indicating a level of output protection of the portable device based on the types of outputs provided by the portable device and the security of such outputs, the types of outputs including at least one member of the group comprising compressed and encrypted copying, uncompressed and decrypted copying, uncompressed digital audio output, compressed digital video output, encrypted analog video output, and decrypted analog audio output;

determining, by the computing device, from the device certificate an identifier identifying the portable device, wherein the identifier is a globally unique identifier or a class identifier;

determining, by the computing device, as required by the license and based on the information relating to the portable device, whether the portable device has one or more assigned output protection levels, wherein each output protection level is indicative of a determined level of security provided to content output by the portable device with respect to a particular type of output thereof;

determining, by the computing device, based on the information relating to the portable device, whether each assigned output protection level satisfies an output protection level requirement set within the license;

determining, by the computing device, based on rules in the license and also based on the information relating to the portable device as set forth within the device certificate, whether the computing device has the license rights to issue the sub-license to the portable device;

determining, by the computing device, from the device certificate whether the portable device has secure metering capabilities for maintaining, by the portable device, state information with respect to a constructed sub-license and for securely storing the maintained state;

based on the determination that the computing device has the license rights to issue the sublicense to the portable device, the determination that the assigned output protection level satisfies the output protection level requirement set within the license, and the determination that the portable device has secure metering capabilities, constructing, by the computing device, such sub-license to include the decryption key (KD); and issuing, by the computing device, the sub-license to the portable device by transmitting the constructed sub-license to the portable device.

2. The method of claim 1, further comprising the computing device determining whether the one or more assigned output protection levels relate to compressed and encrypted copying.

3. The method of claim 2, further comprising the computing device determining whether the compressed and encrypted copying level of the portable device satisfies the output protection level requirement set within the license.

4. The method of claim 1, further comprising the computing device determining whether the device certificate has not expired or been revoked and issuing the sub-license to the portable device if the device certificate has not expired or been revoked.

5. The method of claim 1, further comprising the computing device determining from the device certificate whether the portable device has a secure clock that is set correctly and issuing the sub-license to the portable device if the portable device has a secure clock that is set correctly.

6. The method of claim 1, further comprising the computing device determining whether the portable device identifier is on an exclusion list or inclusion list and issuing the sub-license to the portable device if the portable device identifier is not on the exclusion list or if the portable device identifier is on the inclusion list.

7. A computer-readable hardware storage device having stored thereon computer-executable instructions that, when executed by a computer, cause the computer to implement a method in connection with a computing device having encrypted digital content and a license corresponding to the encrypted digital content, the license having a decryption key (KD) for decrypting the encrypted digital content, the license allowing the computing device to render the encrypted digital content thereon, the method for the computing device to issue a sub-license based on the license to a portable device communicatively coupled thereto, the sub-license for allowing the portable device to render the encrypted digital content thereon using the decryption key (KD), the method comprising the steps of:

receiving, by the computing device, from the portable device a device certificate including information relating to output protection levels assigned to the portable device by an issuer of the device certificate or a third party, the output protection levels assigned to the portable device indicating a level of output protection of the portable device based on the types of outputs provided by the portable device and the security of such outputs, the types of outputs including at least one member of the group comprising compressed and encrypted copying, uncompressed and decrypted copying, uncompressed digital audio output, compressed digital video output, encrypted analog video output, and decrypted analog audio output;

determining, by the computing device, from the device certificate an identifier identifying the portable device, wherein the identifier is a globally unique identifier or a class identifier;

determining, by the computing device, as required by the license and based on the information relating to the portable device, whether the portable device has one or more assigned output protection levels, each output protection level indicative of a determined level of security provided to content output by the portable device with respect to a particular type of output thereof;

determining, by the computing device, based on the information relating to the portable device, whether each assigned output protection level satisfies an output protection level requirement set within the license;

determining, by the computing device, based on rules in the license and also based on the information relating to the portable device as set forth within the device certificate whether the computing device has the license rights to issue the sub-license to the portable device;

determining, by the computing device, from the device certificate whether the portable device has secure metering capabilities for maintaining, by the portable device, state information with respect to a constructed sub-license and for securely storing the maintained state;

based on the determination that the computing device has the license rights to issue the sublicense to the portable device, the determination that the assigned output protection level satisfies the output protection level requirement set within the license, and the determination that the portable device has secure metering capabilities, constructing, by the computing device, such sub-license to include the decryption key (KD); and issuing, by the computing device, the sub-license to the portable device by transmitting the constructed sub-license to the portable device.

8. The device of claim 7, further comprising instructions that enable the computing device to determine whether the one or more assigned output protection levels relate to compressed and encrypted copying.

9. The device of claim 8, further comprising instructions that enable the computing device to determine whether the compressed and encrypted copying level of the portable device satisfies the output protection level requirement set within the license.

10. The device of claim 7, further comprising instructions that enable the computing device to determine whether the device certificate has not expired or been revoked and to issue the sub-license to the portable device if the device certificate has not expired or been revoked.

11. The device of claim 7, further comprising instructions that enable the computing device to determine from the device certificate whether the portable device has a secure clock that is set correctly and to issue the sub-license to the portable device if the portable device has a secure clock that is set correctly.

12. The device of claim 7, further comprising instructions that enable the computing device to determine whether the portable device identifier is on an exclusion list or inclusion list and to issue the sub-license to the portable device if the portable device identifier is not on the exclusion list or if the portable device identifier is on the inclusion list.

* * * * *